(12) United States Patent
Spalink et al.

(10) Patent No.: US 7,747,713 B1
(45) Date of Patent: Jun. 29, 2010

(54) METHOD AND SYSTEM FOR CLASSIFYING INFORMATION AVAILABLE ON A COMPUTER NETWORK

(75) Inventors: Jan-Dieter Spalink, Durham, NC (US); Brian R. D. Gullette, Durham, NC (US); Andrew Hatchell, Cary, NC (US); Randall C. Nortman, Cary, NC (US); Kevin Babyak, Chapel Hill, NC (US); Michael Babyak, Durham, NC (US)

(73) Assignee: Hitwise Pty. Ltd., Melbourne, Victoria (AU)

( * ) Notice: Subject to any disclaimer, the term of this patent is extended or adjusted under 35 U.S.C. 154(b) by 808 days.

(21) Appl. No.: 09/606,683

(22) Filed: Jun. 30, 2000

(51) Int. Cl.
*G06F 15/173* (2006.01)
(52) U.S. Cl. .................... 709/223; 709/224
(58) Field of Classification Search .............. 707/2, 707/3, 7; 709/204, 236, 203, 217–219, 224, 709/212, 213, 216, 223, 229, 245
See application file for complete search history.

(56) References Cited

U.S. PATENT DOCUMENTS

| | | | |
|---|---|---|---|
| 5,053,956 A | | 10/1991 | Donald et al. |
| 5,400,248 A | * | 3/1995 | Chisholm ................ 705/12 |
| 5,933,827 A | * | 8/1999 | Cole et al. .............. 707/10 |
| 5,960,429 A | * | 9/1999 | Peercy et al. ............ 707/5 |
| 5,991,735 A | | 11/1999 | Gerace |
| 6,018,619 A | | 1/2000 | Allard et al. |
| 6,151,584 A | | 11/2000 | Papierniak et al. |
| 6,154,747 A | * | 11/2000 | Hunt ..................... 707/100 |
| 6,219,670 B1 | * | 4/2001 | Mocek et al. ........... 707/102 |
| 6,356,899 B1 | * | 3/2002 | Chakrabarti et al. ...... 707/5 |
| 6,381,597 B1 | * | 4/2002 | Lin ....................... 707/4 |
| 6,385,602 B1 | * | 5/2002 | Tso et al. ................ 707/3 |
| 6,466,940 B1 | * | 10/2002 | Mills ..................... 707/102 |
| 6,483,525 B1 | * | 11/2002 | Tange .................... 345/765 |
| 6,513,033 B1 | * | 1/2003 | Trauring ................. 707/3 |
| 6,546,393 B1 | * | 4/2003 | Khan .................... 707/10 |

(Continued)

FOREIGN PATENT DOCUMENTS

GB 2 346 229 A 2/2000

(Continued)

OTHER PUBLICATIONS

Web Pages printed Nov. 2, 2004 of Internet Draft entitled "Tunneling SSL Through a WWW Proxy", Luotonen, Ari, *Netscape Communications Corporation* (Dec. 14, 1995); 4 pages. http://muffin.doit.org/docs/rfc/tunneling_ssl.html.

(Continued)

*Primary Examiner*—Hussein A Elchanti
(74) *Attorney, Agent, or Firm*—Knobbe, Martens, Olson & Bear LLP (57) ABSTRACT

A method and system for classifying information available on a computer network such as Web sites accessible on the Internet. The system receives a list of network resource locators and submits each locator to a voting process. The invention includes using single-level or multiple-level voting to increase the classification accuracy. One or more Web coders receive a resource locator and determine a classification for that locator. When the necessary votes have been made, the system classifies the locator according to the voting rules.

20 Claims, 4 Drawing Sheets

U.S. PATENT DOCUMENTS

| | | | |
|---|---|---|---|
| 6,553,367 B2 * | 4/2003 | Horovitz et al. | 707/2 |
| 6,601,173 B1 * | 7/2003 | Mohler | 713/201 |
| 6,631,496 B1 * | 10/2003 | Li et al. | 715/501.1 |
| 6,654,813 B1 * | 11/2003 | Black et al. | 709/245 |
| 6,792,458 B1 | 9/2004 | Muret et al. | |
| 6,804,701 B2 | 10/2004 | Muret et al. | |

FOREIGN PATENT DOCUMENTS

| | | |
|---|---|---|
| WO | WO 00/57611 A2 | 9/2000 |
| WO | WO 01/25896 A1 | 4/2001 |
| WO | PCT/IB02/05540 | 10/2004 |

OTHER PUBLICATIONS

Sax, Michael M., "Data Collection and Privacy Protection : An International Perspective", Presentation: Managing Online Risk and Liability Conference, Aug. 31, 1999 (58 pages).

* cited by examiner

METHOD AND SYSTEM FOR CLASSIFYING INFORMATION AVAILABLE ON A COMPUTER NETWORK

BACKGROUND OF THE INVENTION

The present invention relates to a system and method for monitoring and analyzing computer network transaction data to create behavior profiles of network users. More particularly, the present invention relates to a method and system of manually or automatically classifying information available on a computer network. Specifically, the present invention helps classify Internet Web sites to facilitate the construction of more accurate behavior profiles of Internet users for marketing purposes.

In the current Internet world, it has become desirable for service providers and merchants to obtain specific information about Internet users for the purpose of improving the marketing of products and services, measuring the effectiveness of marketing, and tailoring the products and services to meet the requirements of specific customer types.

Behavior profiles are created using network usage data collected through various methods. Once the data is collected, it is analyzed to determine the behavior of a particular user. In order to create an accurate behavior profile, it is useful to generalize Internet usage by identifying the types of Web sites a particular type of user accesses and the way that type of user accesses a particular type of Web site.

For example, it would be valuable to a merchant to know that users from a geographical area regularly purchase books from Amazon.com™; however, there is a need for more generalized data. It is desirable to have a system that can create generalized behavior profiles. It is valuable information to know that users in a particular geographical area regularly conduct electronic commerce by accessing online catalog and shopping sites by following links on a Web portal site.

To provide a system for creating generalized behavior profiles, it is desirable to have a method and system for classifying Web sites using a classification of sufficient granularity to allow meaningful analysis of network transaction data.

Manual classification by users can lead to inconsistent results due to differing understandings of categories within a classification system, differing opinions of the purpose and use of a site, etc. It is desirable to have a method and system that provides a more consistent categorization of information. Additionally, it is desirable to provide a system and method such that inexperienced classifiers can perform the bulk of classification without sacrificing accuracy.

Also, there is a need for an automatic classification system that can quickly and accurately categorize information repositories accessible on a computer network. An automatic classification system can operate more quickly and at less expense than a manual classification system; however, the automatic classification system may not be as accurate as a manual classification system.

Finally, there is a need for a hybrid classification system that uses both manual and automatic classification components to provide increased performance and accuracy.

SUMMARY OF THE INVENTION

In accordance with the invention, there is provided a method for classifying information available on a computer network. The method includes receiving a list of network resource locators. For each network resource locator on the received list, the method includes sending the network resource locator to a Web-coding workstation. Once the locator has been sent to the workstation, the process waits for a vote to be received from the Web coder. Each vote represents a proposed classification for a network resource locator. The result is stored in a database. Finally, the process assigns a classification according to a voting system. In a more specific embodiment, the list of network resource locators includes one or more Web sites. In a further aspect of the invention, the database is a flat file, a binary tree, an object-oriented database, or a relational database.

Additional, more specific embodiments include various voting methods. First, a single-level voting system is presented wherein a classification is assigned upon receipt of a single vote. Next, a single-level voting system is presented requiring more than one vote. Finally, a multiple-level voting system is presented wherein the first level requires three out of four votes, the second level requires two out of three votes, and the third level requires a single vote.

Further in accordance with the present invention, there is provided a system for classifying information available on a computer network. The system includes a resource generator component that creates a list of network resource locators. Additionally, the system includes a datastore component that stores classification information for a plurality of network resource locators. More specific embodiments use a flat file, an object-oriented database, a binary tree, or a relational database as the datastore. The system also includes a graphical user interface (GUI) component and a classification processor component. The classification processor receives a list of network resource locators and determines a classification for each information repository.

More specific embodiments include a system that sorts the list of network resource locators by the number of unique visitors to that particular locator. Additional embodiments use the various voting systems set forth in the method above.

BRIEF DESCRIPTION OF THE DRAWINGS

Having thus briefly described the invention, the same will become better understood from the following detailed discussion, taken in conjunction with the drawings where.

DETAILED DISCUSSION OF THE INVENTION

The present invention includes methods and systems for manually and automatically classifying information on a computer network. In order to simplify explanations of the invention, the following detailed discussion is limited to classifying Web sites on the Internet; however, one of ordinary skill in the art will understand that the invention is not so limited; the method and system herein described may be used to classify any data made available on any network.

Figure 1:
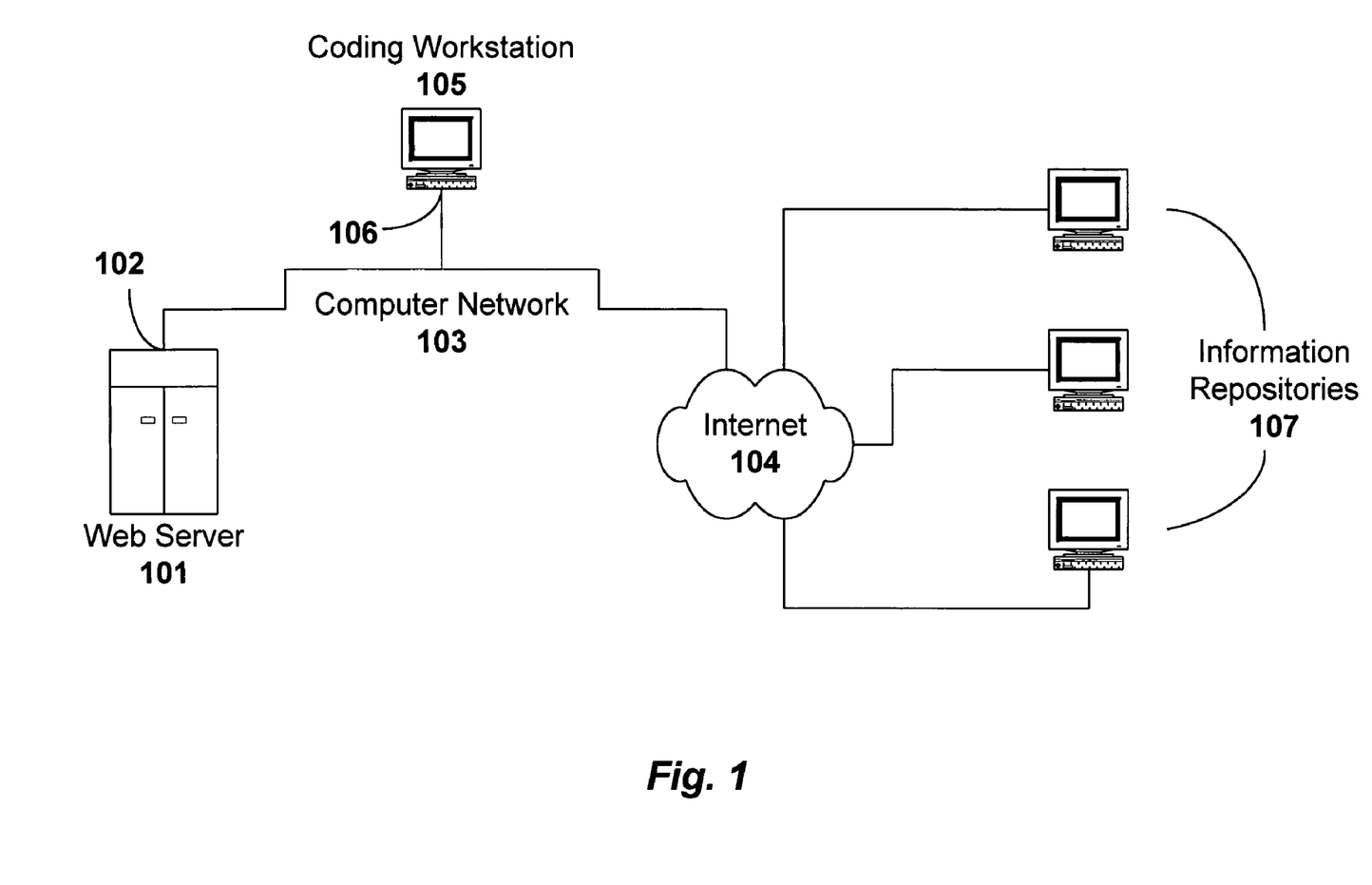
FIG. 1 is a general system schematic diagram showing a coding workstation connected to a computer network and the Internet so that the coding workstation has access to the Web server implementing the present invention and a plurality of information repositories.

The first embodiment of the present invention is a single-vote classification system implemented as a Web-based application using conventional software development techniques familiar to one of ordinary skill in the art. The single-vote system runs on a Web server 101 embodied as a Sun Microsystems™ Enterprise 6500™ server running Apache™ Web server software.

FIG. 1 is a diagram of a hardware implementation of the present invention. The Web server 101 includes a conventional network interface 102 that connects the Web server 101 to a computer network 103. In this embodiment of the present invention, computer network 103 is also connected to the Internet 104 which has connected thereto information repositories 107. A coding workstation 105 also connects to the computer network 103 using a conventional network interface 106.

Figure 2:
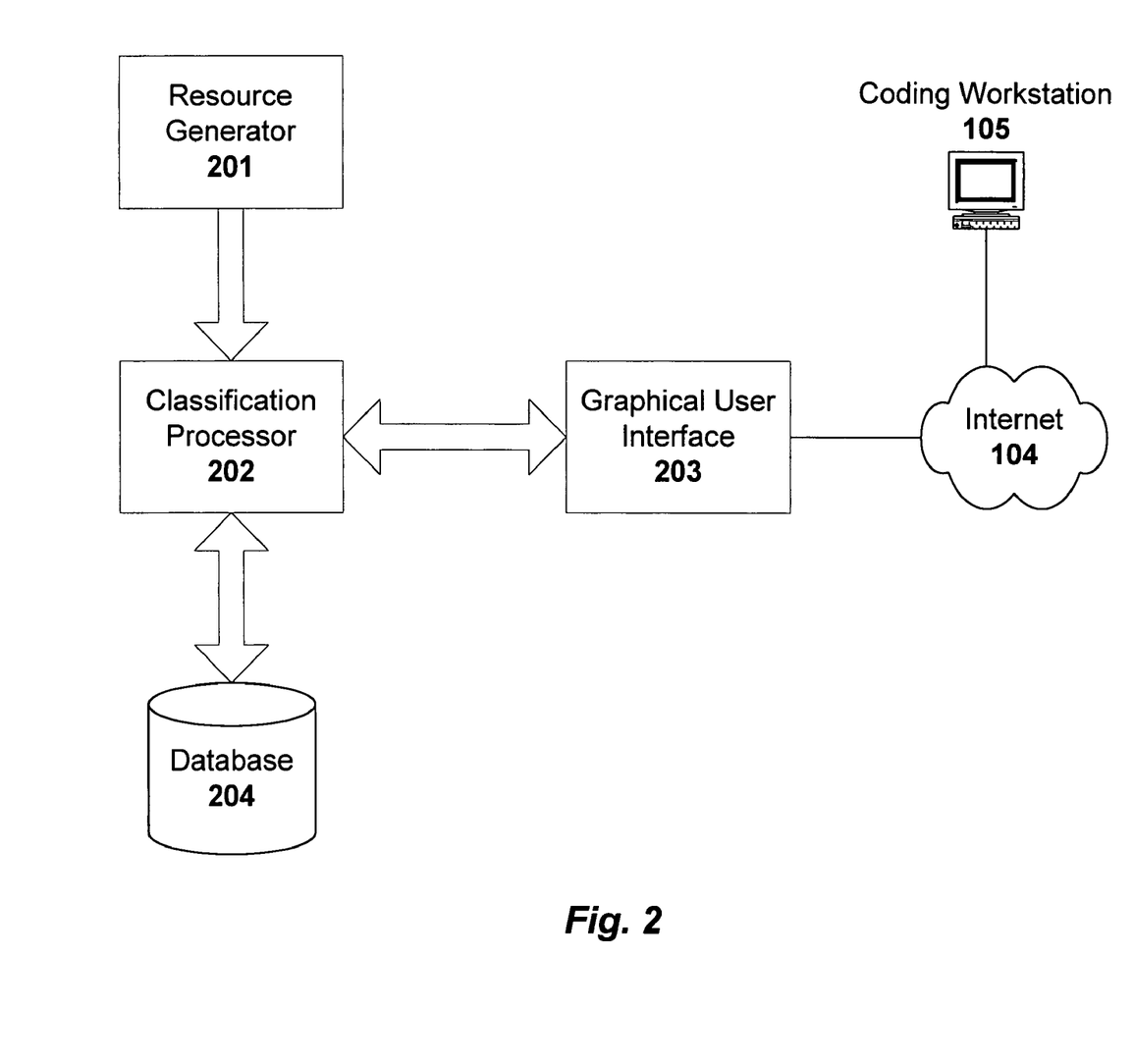
FIG. 2 is a schematic diagram illustrating the interactions between the various components according to one embodiment of the present invention.

FIG. 2 is a block diagram of the software implementation of this embodiment of the present invention. In this embodiment, all of the server software runs on the Web server 101. According to the present invention, network information repositories are categorized according to a classification system. The first embodiment uses a manual classification process to go through and classify various identified Web sites. The list of Web sites to be classified is generated by the resource generator 201.

In one embodiment of the present invention, the resource generator 201 is a Standard Query Language (SQL) statement that directly calls the database 204 to retrieve a list of network resource locators in rank order. This list is used to populate another database table. When the number of unclassified hosts gets low, the resource generator 201 makes another SQL call to retrieve additional network resource locators and populates the database table accordingly.

In another embodiment of the present invention, the resource generator 201 simply inputs a text file containing a list of Web site addresses stored as a list of Uniform Resource Locators (URL). For example, the list may contain the following locators: "http://www.amazon.com" and "http://www.bn.com". In this embodiment, the resource generator 201 processes the list of URLs stored in the text file in order, passing each one to the next component of this embodiment—a classification processor 202.

In an alternate embodiment of the present invention, the classification system is used with a network transaction data-collection system. In this embodiment, the network transaction data-collection system maintains data and statistics on Internet or other computer network usage. The collected network transaction data is used to generate a list of all network resources accessed by users. In most applications, this list quickly becomes unwieldy, so it is desirable to prioritize the list, pruning it down to something manageable. In one embodiment of the present invention, the network transaction data-collection system maintains a list of servers on the Internet that have been accessed by network users. Along with each server, the system maintains the number of unique users that have accessed that server. The list of servers is then sorted based on the number of unique users. This determines the order that servers are classified.

One of ordinary skill in the art will appreciate that there are many other ways to create a list of network resources that need to be categorized. Any such method or system could be used within the present invention.

Once one or more resources to be classified has been determined by the resource generator 201, the classifying processor 202 begins. The classifying processor 202 presents a resource to a user through the GUI 203. The user then looks at the Web site and identifies the classification of that Web site as discussed below.

Web sites are classified according to a system loosely based on the North American Industry Classification System (NAICS) that replaced the Standard Industry Classification (SIC) codes in 1997. NAICS was created to provide a way to compare statistics regarding businesses in the same industry. While providing adequate granularity for describing and classifying all types of businesses within the United States, NAICS fails to provide sufficient granularity for the domain where the present invention is most useful—electronic commerce.

The electronic commerce classification system (ECCS) used in the present invention includes hierarchically arranged categories including classifications such as Web portals and online catalogs.

Figure 3A:
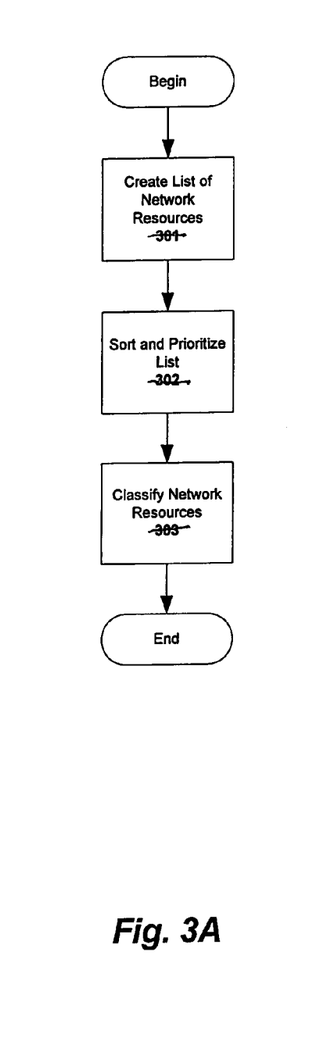
FIG. 3A is a flow chart illustrating how one embodiment of the present invention obtains a list of network resources, sorts and prioritizes the list, and then classifies each of the identified network resources.

In one embodiment of the present invention as shown in FIG. 3A, a Web-coder accesses the Web server 101 using a Web browser such as Microsoft Internet Explorer™ or Netscape Communicator™ running on a coding workstation 105 to view and categorize Web pages. In this embodiment, a Web coder logs on to the Web server 101 by typing a username and password. The system authenticates the user and then displays a list of various statistics about that user, including the total number of Web sites classified, the total classified in the present week, and the total classified during the present day.

Figure 4:
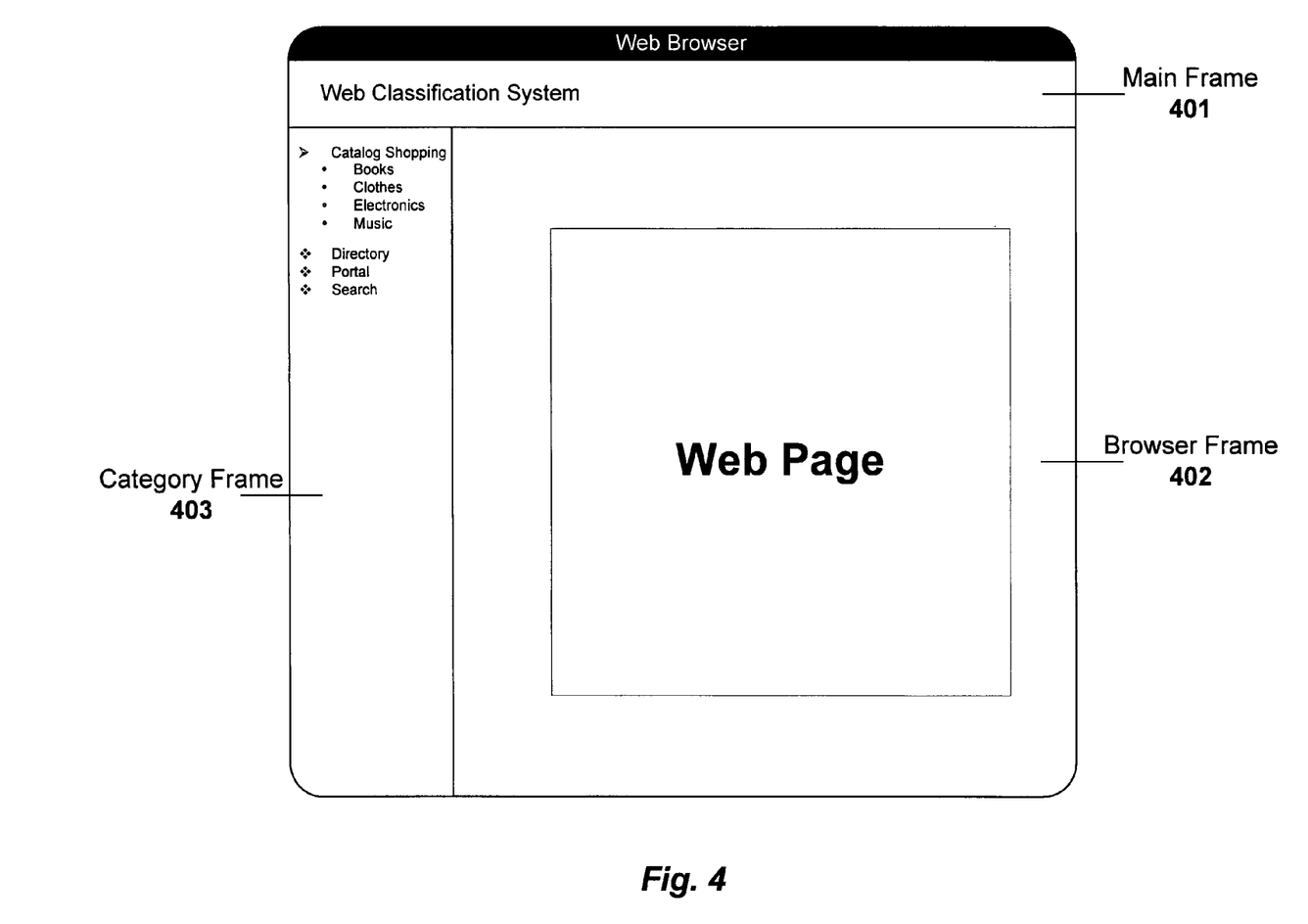
FIG. 4 depicts a sample screen display that a Web coder would see on a coding workstation according to one embodiment of the present invention.

The Web site is implemented using conventional software development techniques known to one of ordinary skill in the art. The system runs on an Apache™ Web server as a series of Common Gateway Interface (CGI) scripts written in Perl™. These scripts present a frame-based GUI to the present Web classification system. As shown in FIG. 4, at the top of the screen is a main frame 401 situated horizontally across the Web browser. This frame displays a logo identifying the Web classification system, a series of statistics about the current authenticated Web coder, and a button labeled "Retrieve Resource". When the user presses the "Retrieve Resource" button, the next available resource is retrieved from the resource generator 201.

While a resource is being displayed by the classification system, the main frame 401 remains displayed, and the resource is shown in the browser frame 402, a frame situated below the main frame 401 and to the right of a category frame 403. The Web coder can browse the displayed resource in the browser frame 402, following links and examining the content of the resource site. The user then selects a resource from the hierarchical taxonomy displayed in the category frame 403.

Each category display in category frame 403 is either a parent category or a terminal category. For example, "electronic commerce shopping site" would be a parent category including child categories such as "music", "books", and "computers." The hierarchical structure is displayed in the conventional manner, allowing a user to compress and expand various nodes within the structure.

Once a Web coder has determined the appropriate classification, the classifier processor 202 updates a database 204 containing a list of all classified network resources. The system also updates the statistics for that user and displays the changed values in the main frame 401. The user can then select the "Retrieve Resource" button again to obtain the next Web site to be classified. This process repeats until the user chooses to stop or the resource generator 201 runs out of servers to classify.

This embodiment of the present invention can encounter problems with Web sites designed to eliminate extraneous frames. According to another embodiment of the present invention, the category frame 403 is implemented as a pull-down menu in which a coder can select the category that best matches the Web page being classified. This embodiment displays a URL. When a coder clicks on the URL, the Web site to be classified opens up in a another window. This prevents that Web site from interfering with the present classification system.

This embodiment of the present invention can support multiple Web coders working to classify a series of Web sites. The resource generator 201 can work in one of several different ways: (1) it can generate only a single resource that needs to be classified at a time; or (2) it can generate a predetermined number for each Web coder and then the classifying processor 202 can process the block. When the block has been completed, the resource generator 201 transmits a new block.

Sometimes, a Web coder's classification may not be accurate. This may be due to several reasons. For example, the Web coder may be inexperienced and somewhat unfamiliar with the particular portion of the classification hierarchy that is relevant; or, the Web coder may misinterpret the purpose behind the site due to the limited time that the Web coder took to view that particular site.

Figure 3B:
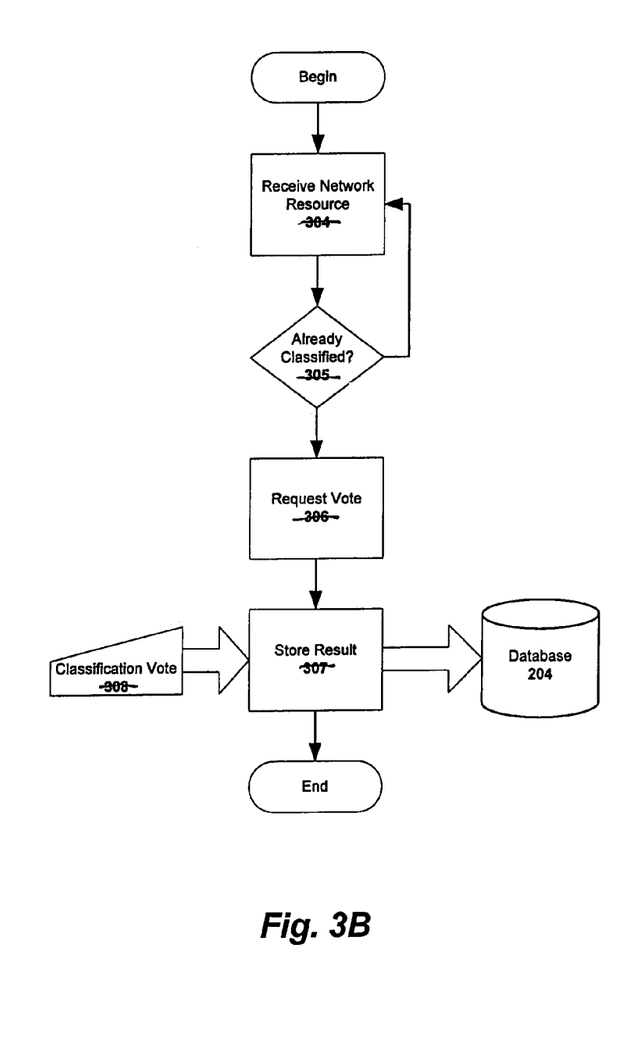
FIG. 3B is a flow chart illustrating how the classification-processing component interacts with a database and a Web coder to classify a network resource according to one embodiment of the present invention.

Another embodiment of the present invention as shown in FIG. 3B improves the accuracy of the classification system by implementing a voting process. Instead of using a single Web coder to classify a given Web site, the system gives queries to at least three different Web coders before accepting an identified classification. Realizing that there will be a difference of opinion as to the classification of some Web sites, the system does not require a unanimous consensus, instead using a multi-level voting system.

At the lowest level are the Level 1 coders. These are typically newer, less experienced classification specialists. At this first level, the system requires at least three out of four coders to agree before a final classification is accepted. If fewer than three out of four agree on a classification, the Web site is passed to the Level 2 coders.

Level 2 coders have more experience and knowledge about the classification system and are able to determine a classification with greater accuracy. At Level 2, two out of three coders must agree on a classification for it to be accepted by the system.

Finally, the top-level coders are called Expert Coders. These individuals usually have the greatest understanding of the classification system. Whatever classification a Expert Coder gives is accepted by the system.

Thus, most classification will be performed by Level 1 coders. Any confusion or disagreements over the appropriate classification will be passed on to a smaller number of Level 2 coders. Finally, a Expert Coder has the ultimate authority to determine a final classification. As part of the status information displayed in the main frame 401, the system displays the votes placed by lower-level coders.

The next component of the system is an automatic classification agent. Such an agent determines the appropriate classification of a Web site without any input from a user. Since the system is susceptible to error, an automatic classification agent counts as a Level 1 coder vote in the multi-level voting system discussed above. By using an automatic classification agent, fewer Level 1 coders are needed to maintain the level of accuracy.

Embodiments of the present invention have now been generally described in a non-limiting manner. It will be appreciated that these examples are merely illustrative of the present invention, which is defined by the following claims. Many variations and modifications will be apparent to those of ordinary skill in the art.

What is claimed is:

1. A computer-implemented method for classifying network resources, comprising:
   by a computerized system that comprises one or more computing devices:
   selecting a network resource to be classified, wherein the network resource is selected based at least partly on usage statistics reflective of actual usage of the network resource by users;
   in response to the selection of the network resource, outputting an identifier of the network resource for presentation to each of a plurality of users via a user interface that provides functionality for the users to vote on a classification of the network resource, said user interface enabling each user to select a classification from a plurality of predefined classifications;
   recording a plurality of votes cast by the plurality of users via the user interface, each of the plurality of the votes designating a classification selected by a respective user for the network resource; and
   assigning a classification to the network resource based at least partly on the recorded plurality of the votes of the plurality of users, wherein the classification of the network resource is assigned if a predetermined number of votes having the same classification is received, wherein the predetermined number of votes corresponds to at least a predefined percentage of the number of said plurality of votes.

2. The method of claim 1, wherein assigning the classification comprises giving different non-zero amounts of weight to different recorded votes.

3. The method of claim 1, wherein the classification is assigned based further on a classification selected by an automated classification agent.

4. The method of claim 1, wherein the network resource is a web site.

5. The method of claim 1, wherein the network resource is a web page.

6. The method of claim 1, wherein the user interface includes a first frame that displays content of the network resource to be classified, and includes a second frame that displays a hierarchy of classifications from which to select a classification for the network resource.

7. The method of claim 1, further comprising maintaining a computer database of vote statistics for each of the plurality of users, said vote statistics reflecting votes casts on a plurality of network resources.

8. The method of claim 1, further comprising, in response to determining that the plurality of votes are not sufficient to assign a classification, outputting the identifier of the network resource for presentation to at least one additional user via the user interface to obtain at least one additional vote.

9. A system for classifying network resources, the system comprising:
   a computer data repository that stores usage statics data reflective of usage levels of each of a plurality of network resources by network users; and
   a computer system programmed, via executable instructions represented in computer storage, to assign classifications to particular network resources according to a process that comprises:
   selecting, based at least partly on the usage statistics data, a network resource to be classified;

outputting an identifier of the selected network resource for presentation to each of a plurality of users via a user interface that provides functionality for the users to vote on a classification of the selected network resource, said user interface enabling each user to select a classification from a plurality of predefined network resource classifications;

recording a plurality of votes cast by the plurality of users via the user interface, each of the plurality of the votes designating a classification selected by a respective user for the selected network resource; and assigning a classification to the selected network resource based at least partly on the recorded votes of the plurality of users, wherein the classification of the network resource is assigned if a predetermined number of votes having the same classification is received, wherein the predetermined number of votes corresponds to at least a predefined percentage of the number of said plurality of votes.

10. The system of claim 9, wherein the computer system is programmed to give different non-zero amounts of weight to different ones of said votes.

11. The system of claim 9, wherein the computer system is programmed to assign the classification based further on a classification selected by an automated classification agent.

12. The system of claim 9, wherein the network resources include specific web sites.

13. The system of claim 9, wherein the network resources include specific web pages.

14. The system of claim 9, wherein the user interface includes a first portion that displays content of the selected network resource, and includes a second portion that displays a hierarchy of classifications from which to select a corresponding network resource classification.

15. The system of claim 9, wherein the computer system is additionally programmed to maintain vote statistics for each of the plurality of users, said vote statistics reflecting votes casts on a plurality of network resources.

16. The system of claim 9, wherein the computer system is additionally programmed to respond to a determination that the plurality of votes are not sufficient to assign a classification by outputting the identifier of the network resource for presentation to at least one additional user via the user interface to obtain at least one additional vote.

17. A method for classifying information available on a computer network, the method including:

receiving a list of network resource locators, said list being created by identifying network resources accessed by users of the network from use data which is related to resources accessed by a number of the users of the network;

for each network resource locator of the created list, sending the network resource locator to a graphical user interface (GUI) component of at least one Web-coding workstation connected to the network, and which is separate from the users of the network;

receiving a selection from at least one Web coder from the at least one Web-coding workstation, with each selection representing a classification for the resource identified by the sent network resource locator, said selection being generated in response to the Web coder using tools of said GUI component and in accordance with a predetermined classification system; and storing the classification in a separate database in relation to said resource locator and to said at least one Web-coding workstation;

wherein said at least one Web-coding workstation comprises more than one Web-coding workstation and wherein said classification is assigned based on receiving more than one source selection from said more than one Web-coding workstation and wherein the network resource locator is sent to said more than one Web-coding workstation, which comprises a plurality of Web-coding workstations, with each one of the plurality of Web-coding workstations being assigned a predetermined level from lowest to highest, and wherein said classification is assigned based on receiving a first predetermined number of same selections from Web-coding workstations at the lowest level, and if the first predetermined number of same selections is not received at the lowest level, basing the classification on receiving a second predetermined number of same selections from Web-coding workstations at the next highest level, and if not received at the next highest level, repeating the process upward by a level until a level specific predetermined number of selections are received from one of the levels.

18. The method of claim 17, wherein said classification is based on a multiple-level voting system including a first level, a second level, and a third level, and wherein a classification is assigned to a network resource locator upon receipt of at least three out of four first level votes, two out of three second level votes, or one third level vote.

19. A system for classifying information available on a computer network, the system including:

a resource generator component that creates a list of network resource locators from use data which is related to network resources accessed by a number of users of the network;

a datastore component for storing classification information for a plurality of network resource locators;

at least one Web-coding workstation connected on the network which is separate from the users of the network, each one of said at least one separate Web-coding workstation having a graphical user interface (GUI) component having tools to allow at least one Web coder to select a classification for each resource respectively identified by the resource locators of said list in accordance with a predetermined classification system; and a classification processor component separate from said datastore component and from said at least one Web-coding workstation that receives the list of network resource locators from the resource generator component, causes presentation of said network resource locators using said GUI component, and receives the classification determined for each resource respectively identified by the network resource locators, and stores the classification in said data store component;

wherein said at least one Web-coding workstation comprises more than one Web-coding workstation, each one of said more than one Web-coding workstations having said graphical user interface (GUI) component having tools to allow more than one user, each corresponding respectively to one of said more than one Web-coding workstations to select a classification for each resource respectively identified by the resource locator of said lists; and wherein the more than one Web-coding workstation connected on the network comprises a plurality of Web-coding workstations, with each one of the plurality of Web-coding workstations being assigned a predetermined level from lowest to highest, and wherein said Web-coding workstations are arranged for selecting and assigning a classification for each resource locator based on receiving a first predetermined number of same selections from Web-coding workstations at the lowest level, and if the first predetermined number of same selections is not received at the lowest level, basing the classification on receiving a second predetermined number of same selections from Web-coding workstations at the next highest level, and if not received at the next highest level, repeating the process upward by a level until a level specific predetermined number of selections are received from one of the levels.

20. The system of claim 19, wherein the classification processor uses a multiple-level voting system which includes a first level, a second level, and a third level, and wherein a classification is assigned to a network resource locator upon receipt of at least three out of four first level votes, two out of three second level votes, or one third level vote.

* * * * *

UNITED STATES PATENT AND TRADEMARK OFFICE
CERTIFICATE OF CORRECTION

PATENT NO. : 7,747,713 B1
APPLICATION NO. : 09/606683
DATED : June 29, 2010
INVENTOR(S) : Spalink et al.

It is certified that error appears in the above-identified patent and that said Letters Patent is hereby corrected as shown below:

At Column 6, Line 59, In Claim 9, change "statics" to --statistics--.

Signed and Sealed this
Fifteenth Day of February, 2011

David J. Kappos
*Director of the United States Patent and Trademark Office*